US006760066B1

(12) United States Patent
Kawamura et al.

(10) Patent No.: US 6,760,066 B1
(45) Date of Patent: Jul. 6, 2004

(54) TV LENS CONTROL APPARATUS

(75) Inventors: Hiroyuki Kawamura, Omiya (JP);
Hiroshi Mizumura, Omiya (JP); Kunio Tsuzuki, Omiya (JP); Shinya Yajima, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/376,333

(22) Filed: Aug. 18, 1999

(30) Foreign Application Priority Data

Aug. 19, 1998 (JP) ............................................ 10-233173
Aug. 19, 1998 (JP) ............................................ 10-233174

(51) Int. Cl.[7] ........................ H04N 5/262; H04N 5/232; G03B 13/00; G03B 17/00
(52) U.S. Cl. ..................... 348/240.3; 348/345; 348/347; 396/79
(58) Field of Search ................................. 348/335, 345, 348/357, 240.99, 240.3, 347; 396/79, 82, 76

(56) References Cited

U.S. PATENT DOCUMENTS

| 4,611,244 | A | * | 9/1986 | Hanma et al. ............... 348/347 |
| 5,247,326 | A | * | 9/1993 | Taniguchi et al. ........... 396/64 |
| 5,587,842 | A | * | 12/1996 | Iijima et al. .................. 396/79 |
| 5,826,117 | A | * | 10/1998 | Kawamura et al. .......... 396/79 |
| 6,219,098 | B1 | * | 4/2001 | Kawamura et al. .......... 348/335 |
| 6,271,882 | B1 | * | 8/2001 | Kawamura et al. .......... 348/335 |
| 6,501,505 | B1 | * | 12/2002 | Kawamura et al. .......... 348/240.3 |

FOREIGN PATENT DOCUMENTS

| JP | 3109878 | 5/1991 | |
| JP | 03109878 A | * 5/1991 | .......... H04N/5/232 |

* cited by examiner

Primary Examiner—Wendy R. Garber
Assistant Examiner—John Villecco
(74) Attorney, Agent, or Firm—Birch, Stewart, Kolasch & Birch, LLP (57) ABSTRACT

In a TV control apparatus, a focus controller and a zoom controller are used to adjust a flange back focal length of a master lens. If a select switch switches the function of a focus controller from a focus lens control function to a master lens control function, a control signal is transmitted as a master lens control signal to a CPU from the focus controller. The master lens is controlled in accordance with the control signals. The focus lens is at a standstill during this period. The focus controller is also used as a master lens controller. If the zoom is at a wide-angle side, the focus controller is switched to the master lens controller, and if the zoom is at a telephoto side, the master lens controller is switched to the focus controller. If a flange back focal length adjustment switch is turned on and the zoom controller sets the zoom at the wide-angle side, the focus controller functions as a controller for adjusting the position of the master lens group. On the other hand, if the zoom is set at the telephoto side, the function of the focus controller is switched to the focus control function for adjusting the position of the focus lens group. This makes it possible to blur an image by operating the controller at hand.

10 Claims, 8 Drawing Sheets

TV LENS CONTROL APPARATUS

BACKGROUND OF THE INVENTION

1. Field of the Invention

The present invention relates generally to a TV lens control apparatus, and more particularly to a control apparatus applied to a TV lens apparatus, which is constructed in such a way as to adjust a flange back focal length by moving a master lens group of a shooting lens optical system by a motor.

2. Description of Related Art

A conventional shooting lens optical system of a TV lens apparatus used for a broadcasting TV camera comprises a focus lens group, a zoom lens group and a master lens group. To properly make an image-forming position of the lens optical system coincide with a position of a picture sensing surface of the camera, the master lens group is moved forward or backward along an optical axis to adjust a flange back focal length (tracking adjustment). The master lens group is moved not only to adjust the flange back focal length but also to get a special effect by intentionally blurring an image while shooting. Normally, the position of the master lens group is adjusted by turning a flange back focal length (F.f.) adjustment knob provided at a lens apparatus body. The master lens group is moved by a motor. There is a TV lens apparatus which enables a macroshooting by moving a master lens group from a F.f. adjusted position (a F.f. position) to a macroshooting position by the operation of a controller, and a TV lens apparatus which enables a shooting with the special effect by moving a master lens group from a F.f. position by the operation of a controller to intentionally shoot a blurred image.

The conventional TV lens apparatus, however, has special controllers for controlling the movements of the lens groups. More specifically, the conventional TV lens apparatus has a focus controller (a focus position demand) for controlling the movement of the focus lens group; a zoom controller (a zoom rate demand) for controlling the movement of the zoom lens group; and a master lens controller for controlling the movement of the master lens group. A cameraman has to operate each controller properly, and thus, it is very complicated to operate the camera.

Japanese Patent Provisional Publication No. 3-109878 discloses a TV lens control apparatus, which drives a master lens group by a motor to enable a macroshooting. According to this TV lens control apparatus, the focus controller is also used to control the master lens group so that the operation of the focus controller can drive the master lens group. This eliminates the necessity of separately operating the focus controller for driving the focus lens and the controller for driving the master lens group. This TV lens control apparatus, however, cannot move the master lens group in order to adjust the flange back focal length although it is able to move the master lens for the macroshooting. More specifically, the master lens group returns to the original F.f. position if the function of the focus controller is switched to the master lens control function to move the master lens group and then the function of the focus controller is switched to the focus lens control function again. It is therefore impossible to adjust the F.f. position by the TV lens control apparatus. If the function of the focus controller is switched from the master lens control function to the focus lens control function, the focus lens group moves to a position designated by a control member (a focus ring) of the focus controller when the master lens is adjusted. Thus, it is necessary to adjust the position of the focus lens group again. On the other hand, if the function of the focus controller is switched from the focus lens control function to the master lens control function, the master lens moves to a position designated by the control member of the focus controller. Thus, it is necessary to adjust the flange back focal length all over again.

SUMMARY OF THE INVENTION

In view of the foregoing, it is an object of the present invention to provide a TV lens control apparatus, which makes it easier to operate a TV camera without the necessity of providing a special controller for controlling the movement of a master lens group of a TV lens apparatus.

It is another object of the present invention to provide a TV lens control apparatus, which makes it possible to properly adjust a flange back focal length of a master lens by means of a focus controller or a zoom controller.

To achieve the above-mentioned object, the present invention is directed to a TV lens control apparatus, which drives at least one movable lens of a focus lens and a zoom lens, and a master lens of a TV lens apparatus by motors, said TV lens control apparatus comprising: a controller for designating a position or moving speed of said movable lens and said master lens by operating one control member, said controller outputting a control signal representing a value according to the operation of said control member; selecting means for deciding whether said movable lens or said master lens is the lens subject to be driven by the control signals outputted from said controller; and drive means for moving said lens subject to be driven from a position when said selecting means switches the lens to be driven, in accordance with changes in said control signals outputted from said controller after the switching operation, said drive means keeping the other lens at a position at the switching operation.

According to the present invention, the focus controller for controlling the focus lens and the zoom controller for controlling the zoom lens are used to control a focus lens to thereby adjust the flange back focal length. Moreover, if a lens to be driven by a controller is switched between the focus lens and the master lens or between the zoom lens and the master lens, the lens is moved in accordance with the operation of the controller after the switching regardless of the operation of the controller before the switching. This prevents the master lens from moving to the position designated by the control member of the controller when the lens to be driven by the focus controller is switched to the master lens. In addition, it is possible to adjust the flange back focal length of the master lens from the previously-set F.f. position without adjusting the flange back focal length of the master lens all over again.

To achieve the above-mentioned object, the present invention is directed to a TV lens control apparatus, which has a focus lens group, a zoom lens group and a master lens group and moves each lens group by a motor, said TV lens control apparatus comprising: a focus controller for outputting a lens movement instruction signal in accordance with the operation of a focus control member; a zoom controller for outputting a zoom instruction signal in accordance with the operation of a zoom control member; switch means which is turned on in order to adjust the position of said master lens group; detecting means for detecting the zoom position; and a control part for controlling the drive of said lens groups in accordance with the instruction signals from said focus controller and said zoom controller, said control part using the lens movement instruction signal outputted from said focus controller as a master lens group movement instruction to drive said master lens group in accordance with said lens movement instruction signal if said switch means is turned on and the zoom position detected by said detecting means is at a preset wide-angle side, and using the lens movement instruction signal outputted from said focus controller as a focus lens group movement instruction to drive said focus lens group in accordance with said lens movement instruction signal if the zoom position detected by said detecting means is at a preset telephoto side.

According to the present invention, the focus controller is also used to control the master lens group. Turning on the switch means causes the control part to switch the function of the focus controller from the focus lens group control function to the master lens group control function.

It is possible to blur an image by adjusting the position of the focus lens group since the depth of focus is small at the telephoto side. On the other hand, it is impossible to blur an image by adjusting the position of the focus lens group since the depth of focus is great at the wide-angle side. To address this problem, the image is blurred by adjusting the position of the master lens group. Therefore, according to the present invention, the focus controller controls the movements of the master lens group if the zoom is set at the wide-angle side, and the focus controller controls the focus lens as usual if the zoom is set at the telephoto side.

This eliminates the necessity of providing a special controller for adjusting the position of the master lens group and makes it easier to operate the camera.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
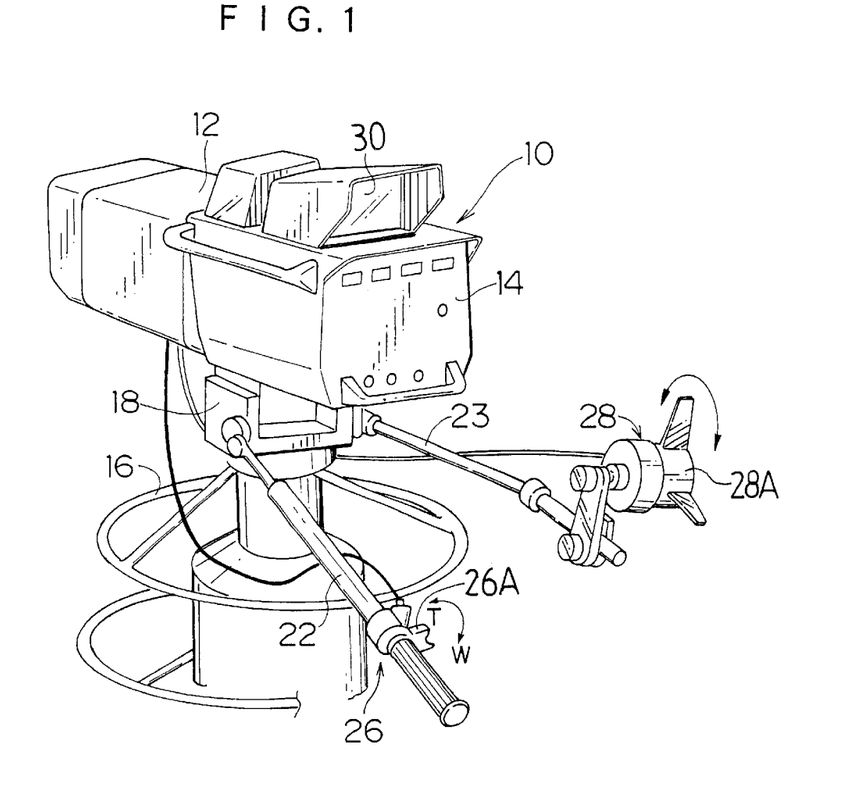
FIG. 1 is a perspective view showing an example of a TV camera with a lens apparatus, to which a TV lens control apparatus of the first embodiment according to the present invention is applied.

FIG. 1 is a perspective view showing an example of a TV camera with a lens apparatus, to which a TV lens control apparatus of the first embodiment according to the present invention is applied. The TV camera 10 in FIG. 1 comprises a lens apparatus 12 and a camera body 14. The TV camera 10 is supported on a panhead 18 above a pedestal dolly 16. A pair of control rods 22, 23 extends from the panhead 18. A zoom controller 26 for controlling a zoom speed and a focus controller 28 for controlling a focus are attached to the ends of the control rods 22, 23, respectively.

The zoom controller 26 has a thumb ring 26A, which is capable of rotating clockwise and counterclockwise from a reference position. A zoom lens can be moved to a wide-angle side or a telephoto side by rotating the thumb ring 26A by the thumb of the left hand to adjust the rotational amount and direction from the reference position.

The focus controller 28 has a rotatable focus ring 28A. A focus lens can be moved to a desired position by rotating the focus ring 28A with the right hand to adjust the rotational position of the focus ring 28A.

A viewfinder 30 is disposed at the top of the camera body 14. A cameraman can properly adjust the zoom and focus of the lens apparatus 12 by operating the zoom controller 26 and the focus controller 28 while looking at a picture on the viewfinder 30.

The lens apparatus 12 has a motor-driven master lens for adjusting an image-forming position of a shooting lens system. The lens apparatus 12 can connect to a master controller, which controls the position of the master lens, in addition to the zoom controller 26 and the focus controller 28. The position of the master lens can be adjusted by a flange back focal length (F.f.) adjustment knob, which is provided at the side of the lens apparatus 12 so as to make the image-forming position of the shooting lens system accurately coincide with the position of a picture sensing surface of the camera (this adjustment is called a F.f. adjustment). If the lens apparatus 12 connects to the master controller, the F.f. adjustment can be also performed by the master controller. The master controller is used not only for the F.f. adjustment but also for a macroshooting or a shooting aiming at special effects.

The lens apparatus 12 can also perform the F.f. adjustment by the zoom controller 26 and the focus controller 28 as well as the F.f. adjustment knob and the master controller. More specifically, the zoom controller 26 has a select switch for switching the lens subject to control between the focus lens and the master lens, and the focus controller 28 has a select switch for switching the lens subject to control between the focus lens and the master lens. If the master lens is selected by operating one of these select switches, the F.f. position of the master lens can be adjusted by operating one of the control members (the thumb ring 26A and the focus ring 28A) of one of the controllers (the zoom controller 26 and the focus controller 28). Consequently, the cameraman can perform the F.f. adjustment by the controllers at hand without using the F.f. adjustment knob. Even during the shooting, the F.f. position can be corrected easily and quickly.

Figure 2:
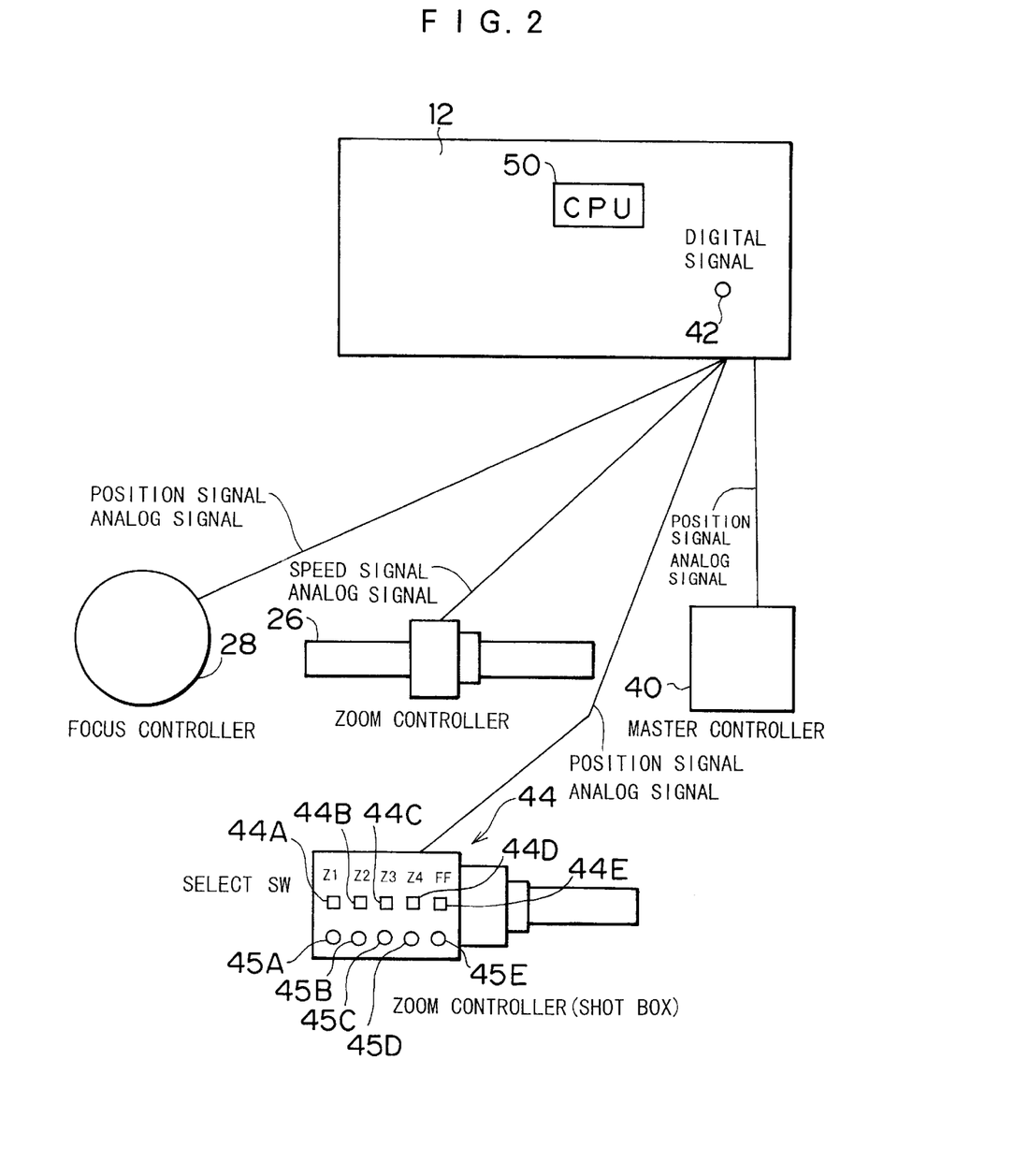
FIG. 2 is a conceptual view showing the connections of the lens apparatus and controllers.

FIG. 2 is a conceptual view showing the connections between the lens apparatus 12 and the controllers. As shown in FIG. 2, the lens apparatus 12 can connect to the zoom controller 26, the focus controller 28 and the master controller 40. The lens apparatus 12 body has the F.f. adjustment knob 42 for adjusting the F.f. position of the master lens. The lens apparatus 12 may also connect to a zoom controller having a shot box 44 in FIG. 2 instead of the zoom controller 26. The shot box 44 is capable of moving the zoom lens to a desired position in one shot. The shot box 44 has a plurality of select switches 44A–44E and corresponding adjustment knobs 45A–45E. Turning on one of the select switches 44A–44D moves the zoom lens to a position, which is designated by the adjustment dial corresponding to the turned-on select switch. If the select switch 44E with a mark "F.f." is turned on, the master lens moves to a position designated by the corresponding adjustment dial 45E.

The controllers analog-detect the operated amounts of the control members (the thumb ring 26A, the focus ring 28A and the adjustment knobs 45A–45E) with potentiometers, or the like, and output the detected signals (control signals) to a CPU 50 of the lens apparatus 12. The CPU 50 processes the control signals, which are outputted from the zoom controller 26, as speed signals representing the moving speed of the zoom lens. On the other hand, the CPU 50 processes the control signals, which are outputted from the focus controller 28, the master controller 40 and the shot box 44, as position signals representing the set position of the lens (the movement ending position).

Figure 3:
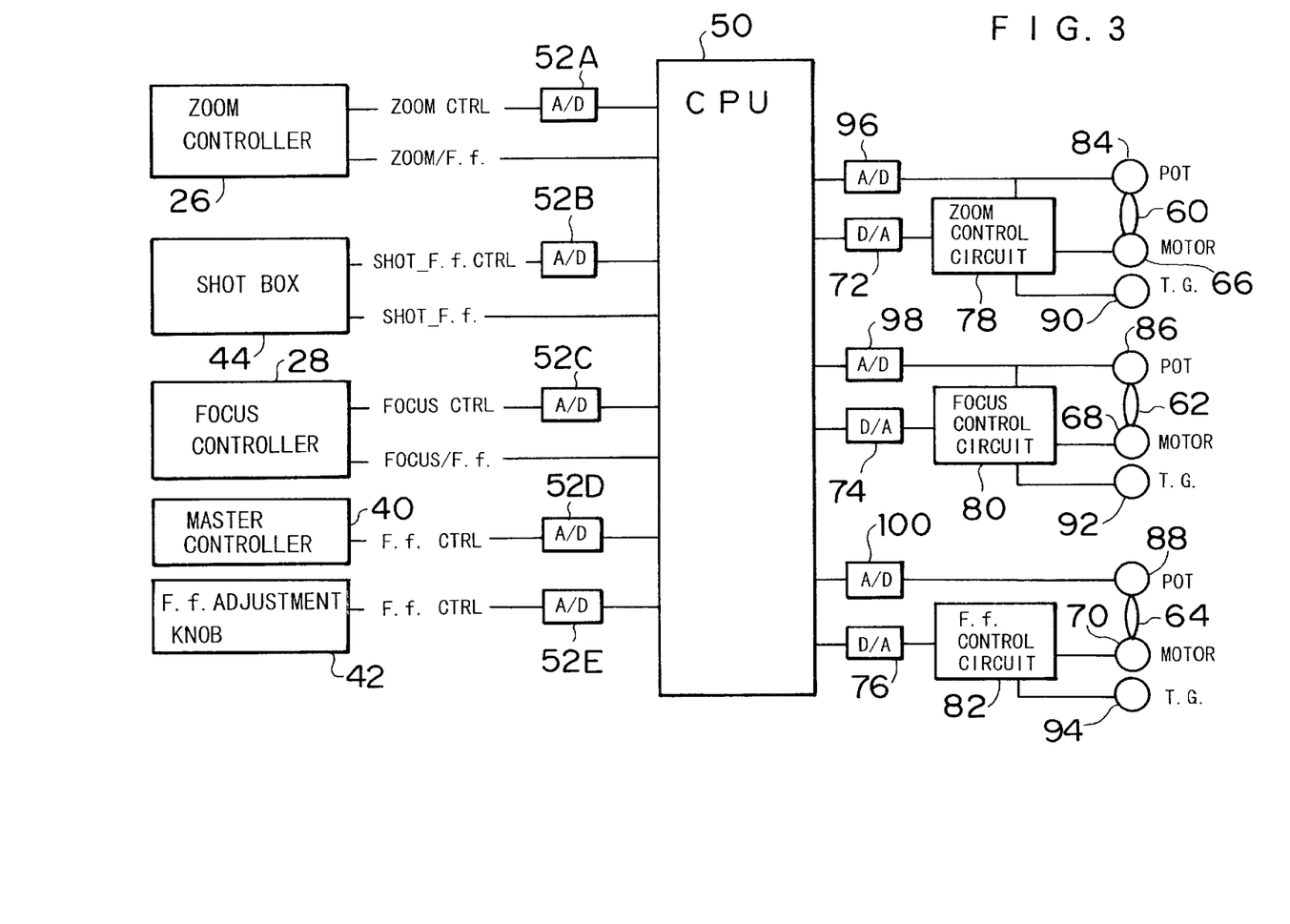
FIG. 3 is a circuit diagram showing the TV lens control apparatus of the first embodiment according to the present invention.

FIG. 3 is a circuit diagram showing relations between the controllers and the CPU 50 in the lens apparatus 12 and the drive part for each lens. As shown in FIG. 3, the CPU 50 of the lens apparatus 12 receives the signals from the zoom controller 26, the focus controller 28, the master controller 40 and the shot box 44. The CPU 50 receives control signals with a voltage corresponding to the rotational position of the thumb ring 26A from the zoom controller 26 through an A/D converter 52A. As stated previously, the zoom controller 26 has the select switch for deciding whether the zoom controller 26 should be used for the zoom lens 60 or the master lens 64. The CPU 50 receives a select signal indicating whether the select switch is on or off.

If the lens apparatus 12 connects to the shot box 44 instead of the zoom controller 26, the CPU 50 receives a control signal with a voltage corresponding to the position of one of the adjustment knobs 45A–45E selected by the select switches 44A–44E from the shot box 44 through an A/D converter 52B. The CPU 50 also receives a select signal, which indicates whether the select switch 44E for deciding that the shot box 44 is used for the master lens 64 is on or off.

The CPU 50 receives a control signal with a voltage corresponding to the rotational position of the focus ring 28A from the focus controller 28 through an A/D converter 52C. As is the case with the zoom controller 26, the focus controller 28 has the select switch for deciding whether the focus controller 28 should be used for the focus lens 62 or the master lens 64. The CPU 50 receives a select signal indicating whether the select switch is on or off. The CPU 50 receives a control signal with a voltage corresponding to the rotational position of the adjustment dial for designating the position of the master lens 64 from the master controller 40 through an A/D controller 52D. The CPU 50 receives a control signal with a voltage corresponding to the rotational position of the F.f. adjustment knob 42 from the F.f. adjustment knob 42 through an A/D converter 52E.

On the other hand, the lens apparatus 12 has the zoom lens 62, the focus lens 62 and the master lens 64. Motors 66, 68, 70 drive the lenses 60, 62, 64, respectively. A zoom control circuit 78, a focus control circuit 80 and a flange back control circuit 82 run the motors 66, 68, 70 in accordance with control signals, which are inputted from the CPU 50 through D/A converters 72, 74, 76. The CPU 50 generates the control signals, which will be outputted to the control circuits 78, 80, 82, in accordance with the control signals inputted from the controllers. Consequently, the lenses 60, 62, 64 move to the positions or at the speeds, which are designated by the controllers. The lenses 60, 62, 64 have potentiometers 84, 86, 88 and tachogenerators 90, 92, 94. The potentiometers 84, 86, 88 determine the current positions of the lenses 60, 62, 64, respectively, and the tachogenerators 90, 92, 94 determine the rotational speeds of the motors 66, 68, 70, respectively (the moving speed of the lenses 60, 62, 64). The CPU 50 or the control circuits 78, 80, 82 control the positions or moving speeds of the lenses 60, 62, 64 with reference to detection signals outputted from the potentiometers 84, 86, 88 and the tachogenerators 90, 92, 94 (the CPU 50 receives the detection signals through A/D converters 96, 98, 100).

Figure 4:
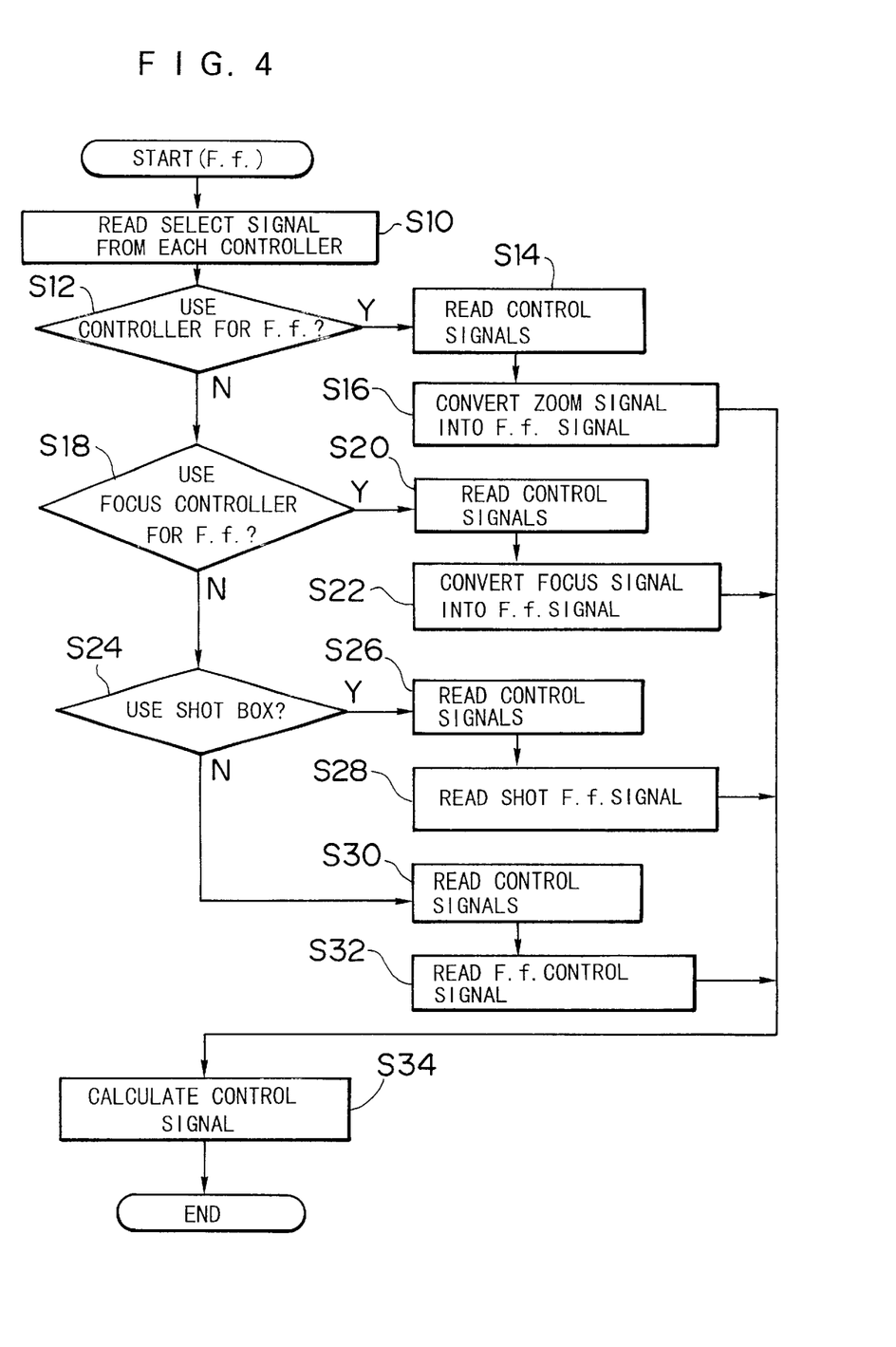
FIG. 4 is a flow chart showing the procedure for controlling a master lens (flange back focal length adjustment) in accordance with control signals from the controllers.

A description will now be given of the procedure for controlling the master lens 64 (the F.f. adjustment) in accordance with the control signals from the controllers with reference to the flow chart of FIG. 4. First, the CPU 50 read the select signals from the controllers. Then, the CPU 50 determines in the following matters at steps S12, S18 and S24. First, the CPU 50 determines whether the zoom controller 26 is selected for the F.f. adjustment (step S12). If the CPU 50 determines that the zoom controller 26 is selected for the F.f. adjustment, the CPU 50 reads the control signals from the controllers (step S14) and converts the control signal (a zoom signal) from the zoom controller 26 into a control signal (an F.f. adjustment signal) for controlling the master lens 64 (step S16).

If the CPU 50 determines that the zoom controller 26 is not selected for the F.f. adjustment at the step S12, then the CPU 50 determines whether the focus controller 28 is selected for the F.f. adjustment (step S28). If the CPU 50 determines that the focus controller 28 is selected for the F.f. adjustment, then the CPU 50 reads the control signals from the controllers (step S20) and converts the control signal (a focus signal) from the focus controller 28 into a control signal (an F.f. adjustment signal) for controlling the master lens 64 (step S22).

If the CPU 50 determines that the focus controller 28 is not selected for the F.f. adjustment at the step S18, then the CPU 50 determines whether the select switch 44E of the shot box 44 is selected or not, in other words, whether the adjustment knob 45E corresponding to the select switch 44E is selected for the F.f. adjustment (step S24). If the CPU 50 determines that the adjustment knob 45E is selected for the F.f. adjustment, then the CPU 50 reads the control signals from the controllers (step S26) and reads the control signal (an F.f. adjustment signal (a shot F.f. signal)), which is outputted from the shot box 44 in accordance with the position of the adjustment knob 45E (step S28).

If the CPU 50 determines that the adjustment knob 45E is not selected for the F.f. adjustment at the step S24, the CPU 50 reads the control signals from the controllers (step S30) and reads the control signal (an F.f. adjustment signal) from the master controller 40, which is used for controlling the master lens 64 (step S32).

In accordance with the control signal for controlling the master lens 40, the CPU 50 generates a control signal and outputs the control signal to the flange back control circuit 82 through the D/A converter 76 (step S34). This will hereunder be described in further detail. If there is a change in the control signals inputted from the controllers or one of the control signals inputted from the master controller 40 and the F.f. adjustment knob 42 in the case at least one of the focus controller 28 and the shot box 44 is switched to the control of the master lens 64, the CPU 50 generates a control signal for moving the master lens 64 from the current position by a movement amount equivalent to the change. If there is a change in the control signal from the zoom controller 26 in the case that the zoom controller 26 is switched to the control of the master lens 64, the CPU 50 generates a control signal for moving the master lens 64 from the current position at a moving speed corresponding to the change.

Consequently, the F.f. adjustment for the master lens 64 can be performed by a desired controller. Moreover, if the focus controller 28 controls the focus lens and is switched to the control of the master lens 64 with the select switch, a subsequent operation of the focus ring 28A can move the master lens from the current position.

Figure 5:
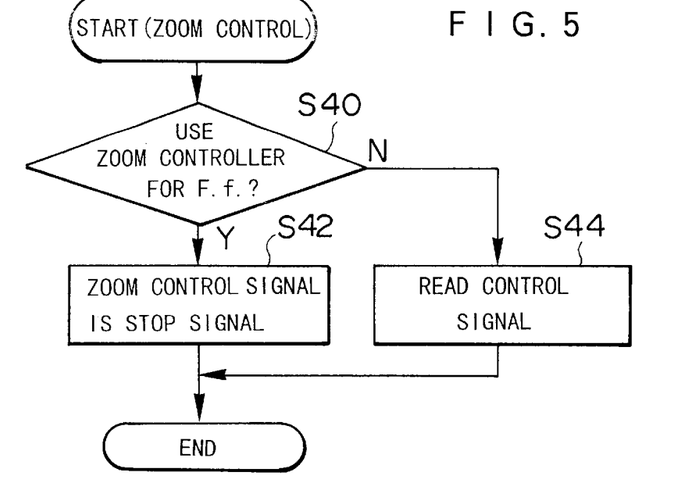
FIG. 5 is a flow chart showing the procedure for controlling a zoom lens in accordance with control signals from the controllers.

FIG. 5 is a flow chart showing the procedure of the CPU 50 for controlling the zoom lens 60. First, the CPU 50 determines whether the zoom controller 26 is selected for the F.f. adjustment (step S40). If the CPU 50 determines that the zoom controller 26 is selected for the F.f. adjustment, the CPU 50 outputs a control signal (a zoom control signal) of the zoom lens 40 as a stop signal and stops the zoom lens 40 whether the zoom controller 26 is operated or not (step S42). If the CPU 50 determines that the zoom controller 26 is not selected for the F.f. adjustment, then the CPU 50 reads the control signal from the zoom controller 26 and moves the zoom lens 60 in accordance with the control signal (step S44).

Consequently, the zoom lens 60 is at a standstill while the zoom controller 26 is used for controlling the master lens 64.

Figure 6:
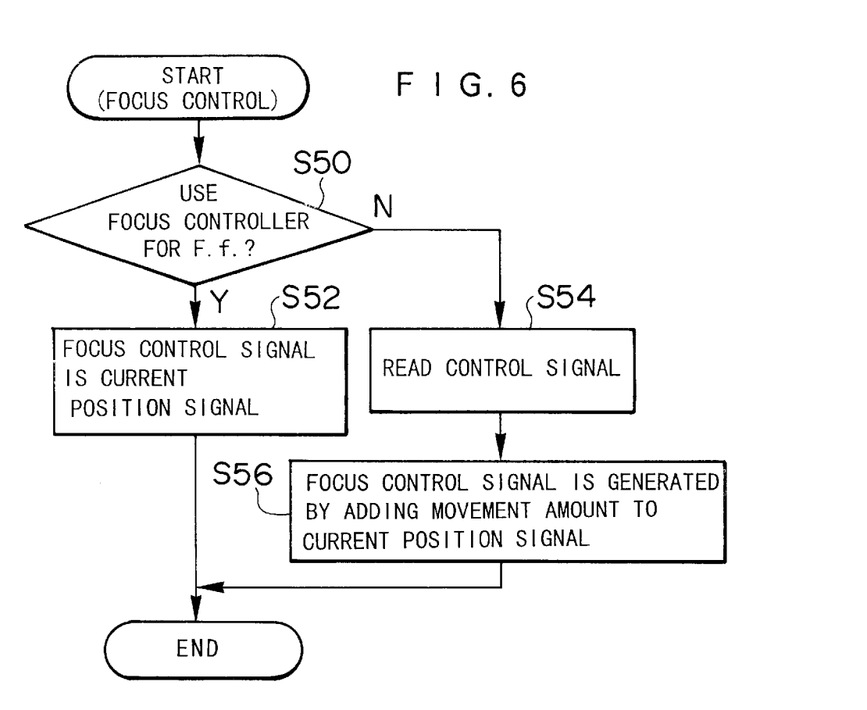
FIG. 6 is a flow chart showing the procedure for controlling a focus lens in accordance with control signals from the controllers.

FIG. 6 is a flow chart showing the processing procedure of the CPU 50 for controlling the focus lens 62. First, the CPU 50 determines whether the focus controller 28 is selected for the F.f. adjustment (step S50). If the CPU 50 determines that the focus controller 28 is selected for the F.f. adjustment, the CPU 50 outputs a control signal (a focus control signal) of the focus lens 62 as a current position signal and stops the focus lens 62 at the current position whether the focus controller 28 is operated or not (step S52). If the CPU 50 determines that the focus controller 28 is not selected for the F.f. adjustment, the CPU 50 reads the control signal from the focus controller 28 (step S54) and controls the focus lens 62 in accordance with the focus control signal, which is acquired by adding the movement amount to the current position signal (step S56). More specifically, if the control signal from the focus controller 28 represents a signal for moving the focus lens 62 from a point A to a point B, the focus lens 62 is not moved to the point B but the distance between the points A and B is added to the current position of the focus lens 62. The focus lens 62 is moved to a position found by the addition.

Consequently, the focus lens 62 is at a standstill while the focus controller 28 is used for controlling the master lens 64. If the focus controller 28 is switched from the control of the master lens 64 to the control of the focus lens 62 with the select switch, a subsequent operation of the focus ring 28A moves the focus lens 62 from the current position. Accordingly, even after the F.f. adjustment of the master lens 64, the focus lens 62 can be operated from the position before the F.f. adjustment.

Figure 7:
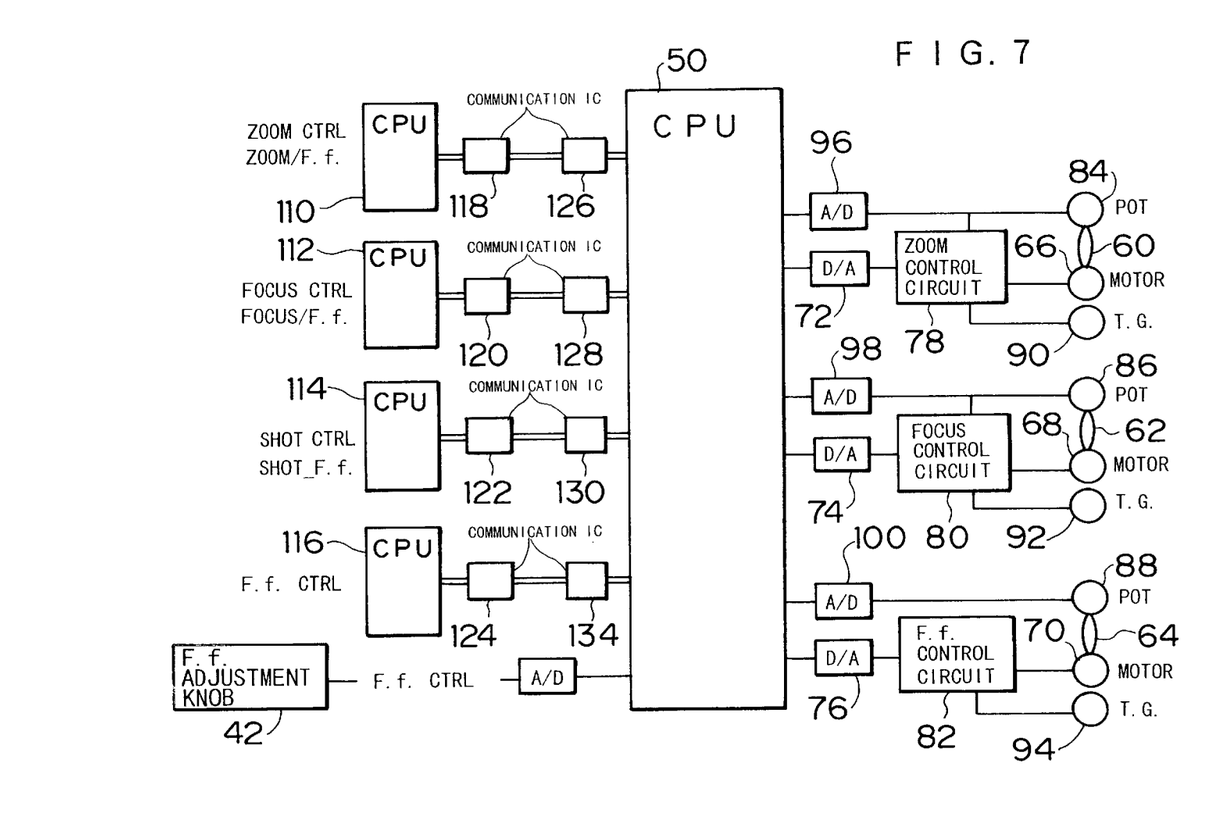
FIG. 7 is a circuit diagram showing the second embodiment of a TV lens control apparatus according to the present invention.

The controllers output the analog control signals in the first embodiment, but the present invention should not be restricted to this. The present invention may also be applied to the case where the CPUs of the controllers transmit digital control signals to the lens apparatus 12. FIG. 7 is a circuit diagram showing the second embodiment of the TV lens control apparatus according to the present invention. In FIG. 7, parts similar to those described with reference to FIG. 3 are denoted by the same reference numerals. As shown in FIG. 7, CPUs 110, 112, 114, 116 of the zoom controller, the focus controller, the shot box and the master controller, respectively, transmit control signals to the lens apparatus 12 through communication ICs 118, 120, 122, 124. Communication ICs 126, 128, 130, 132 in the lens apparatus 12 receive the control signals and input them to the CPU 50. In this case, the CPU 50 controls the lenses in the same manner as described with reference to FIGS. 4–6 except that the CPU 50 receives different signals from the above-mentioned analog control signals.

Figure 8:
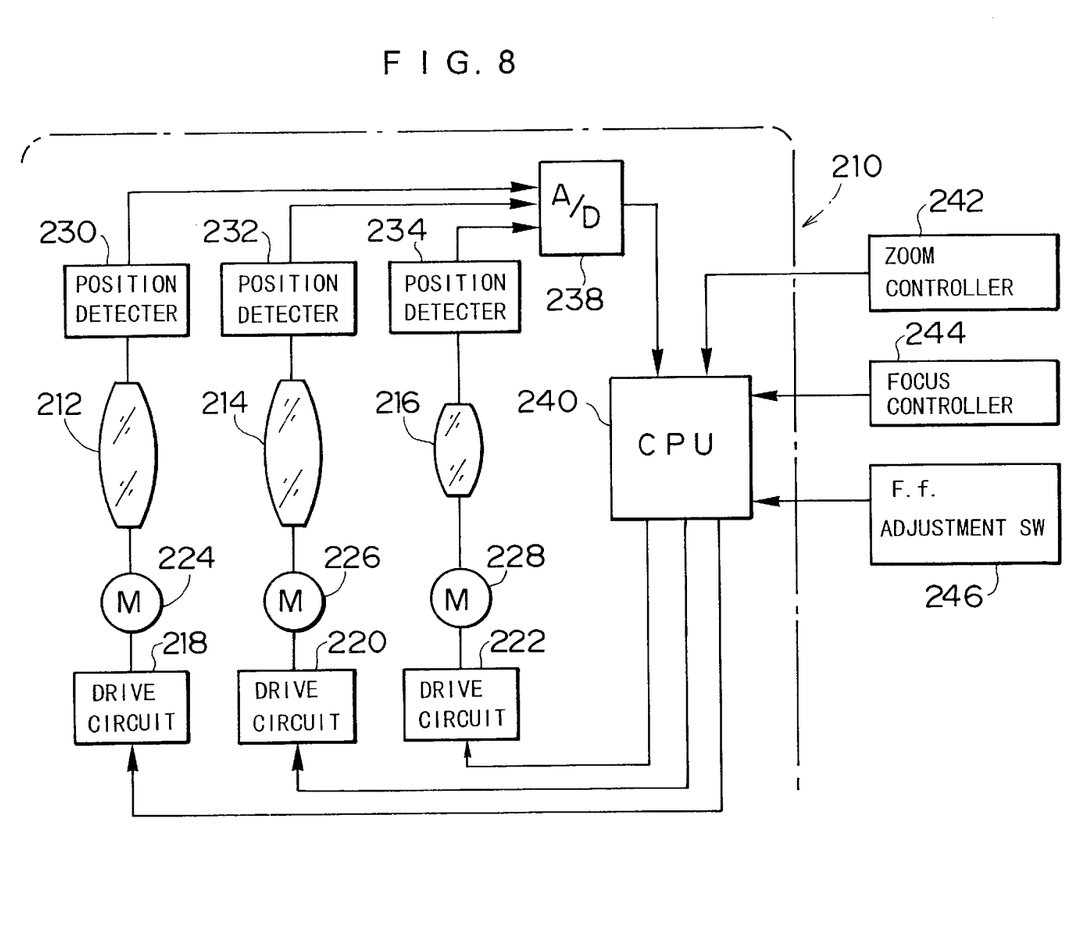
FIG. 8 is a block diagram showing the structure of a TV lens control apparatus according to the third embodiment of the present invention.

FIG. 8 is a block diagram showing the structure of the TV lens control apparatus according to the third embodiment of the present invention.

As shown in FIG. 8, the TV lens apparatus 210 is provided with a focus lens group 212, a zoom lens group 214 and a master lens group 216. The TV lens apparatus 210 has drive circuits 218, 220, 222 and motors 224, 226, 228 for driving the lens groups 212, 214, 216. In FIG. 8, each lens group is shown as one lens, but actually, each lens group is composed of one or more lenses.

The TV lens apparatus 210 has position detecting means 230, 232, 234 for determining the positions of the lens groups 212, 214, 216; an A/D converter 238 for converting detection signals obtained by the position detecting means 230, 232, 234 into digital signals; and a central processing unit (CPU) 240 for controlling the driving of the lens groups 212, 214, 216.

The CPU 240 controls the drive circuits 218–222, and the drive circuits 218–222 drive the motors 224–228 in accordance with control signals from the CPU 240. The rotational forces of the motors 224–228 are transmitted to the lens groups 212–216, and therefore, the lens groups 212–216 move forward or backward along an optical axis.

Potentiometers, for example, are used as the position detecting means 230–234, and the detection signals are sent from the position detecting means 230–234 to the CPU 240 through the A/D converter 238.

A zoom controller 242, a focus controller 244 and a flange back focal length (F.f.) adjustment switch 246 (equivalent to a switch means) are provided to control the TV lens apparatus 210. The CPU 240 receives signals outputted from the controllers 242, 244 and a signal indicating whether the F.f. adjustment switch 246 is on or off.

The zoom controller 242 is a zoom rate demand provided with a rotary control member (equivalent to a zoom control member), which is called a thumb ring. The zoom controller 242 outputs a signal (a zoom speed designation signal) designating the zoom speed in a telephoto direction or a wide-angle direction in accordance with the rotated direction and amount of the thumb ring from a neutral position. Although not shown in the drawing, the zoom controller 242 is arranged in proximity to a grip of a pan rod attached to a panhead, which supports the TV camera.

The focus controller 244 is used to control both the focus lens group 212 and the master lens group 216. More specifically, the focus controller 244 is normally used to control the focus, and it can be used to control the F.f. when the F.f. adjustment switch is pressed (ON).

The focus controller 244 outputs a signal designating the position of the focus lens group 212 or the master lens group 216 (a focus position designation signal or an F.f. position designation signal) in accordance with a rotated direction and amount of a rotary control member (equivalent to a focus control member). Although not shown in the drawing, the focus controller 244 is attached to the panhead, which supports the TV camera, through a suitable attachment means so that the cameraman can handle the focus controller 244 at hand.

The zoom controller 242 and the focus controller 244 are not restricted to those described above. For example, a zoom controller may designate the telephoto or wide-angle direction of the zooming by the operation of a button, and a control apparatus may have both a zoom control function and a focus control function.

The TV lens apparatus 210 may connect to a variety of controllers such as a shot box which instantaneously moves a lens to previously-stored focusing and zooming positions in response to the operation of a button in addition to the zoom controller 242 and the focus controller 244.

The F.f. adjustment switch 246 is used to turn on and off the driving for the master lens group 216. The F.f. adjustment switch 246 is normally off, and it is turned on when the master lens group 216 is moved. The F.f. adjustment switch 246 is preferably attached to the controller at hand such as the zoom controller 242.

A description will be given of the operation of the TV lens control apparatus, which is constructed in the above-mentioned manner.

Figure 9:
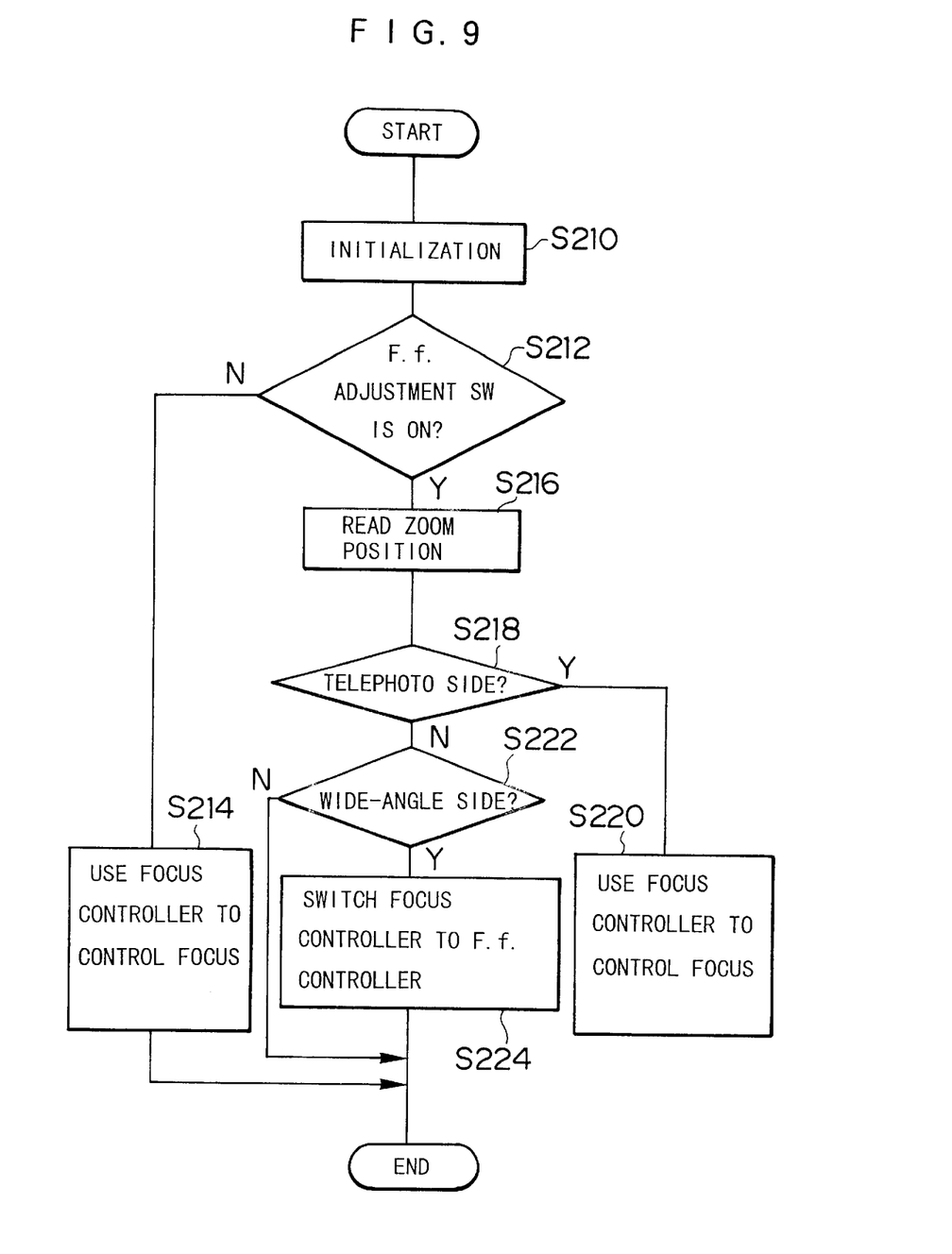
FIG. 9 is a flow chart showing the processing procedure of a CPU according to the third embodiment of the present invention

As shown in the flow chart of FIG. 9, the initialization is performed (step S210) in response to the start of the processing in the CPU 240. Then, the state of the F.f. adjustment switch 246 is checked (step S212). As described above, the F.f. adjustment switch 246 is normally off. Thus, the CPU 240 sets the focus controller 244 as a controller for the focus control (step S214) if the F.f. adjustment switch 246 is not pressed. In this case, when the rotary control member (the focus control member) is operated, the focus lens group 212 moves in accordance with the operation to thereby adjust the focus.

If the F.f. adjustment switch 246 is pressed at the step S212, the CPU 240 reads the zoom position determined by the position detecting means 232 through the A/D converter 238 (step S216).

The movable field of the zoom lens group 214 from the telephoto end to the wide-angle end is divided into a telephoto side and a wide-angle side with a preset zoom position being a boundary. It is determined whether the current zoom position read at the step S216 belongs to the telephoto side or not (step S218). It is also possible to determine the preset zoom position as the wide-angle end. In this case, if the zoom position corresponds to the wide-angle end, the zoom position is determined as being at the wide-angle side, and the zoom position is determined as being at the telephoto side if the zoom position does not correspond to the wide-angle end.

If the zoom position is at the telephoto side, the focus controller 244 can be used to control the focus (step S220). In this case, the operation of the focus control member moves the focus lens group 212.

If the current zoom position is not determined as being at the telephoto side at the step S218, then the CPU 240 determines whether the current zoom position is at the wide-angle side or not (step S222). If the zoom position is at the wide-angle side, the CPU 240 switches the functions of the focus controller 244 so that it can be used as a controller for the master lens group 216 (a controller for the F.f. adjustment) (step S224). In this case, when the focus control member is operated, the master lens group 216 moves accordingly to 715 enable the F.f. adjustment. Particularly at the wide-angle side with a great depth of focus, it is desirable to use the focus control member to blur an image during the imaging.

A storage means (not shown) may contain the position of the master lens group 216, which is set in the F.f. adjustment prior to the start of the imaging. When the F.f. adjustment switch 46 is turned off after the blurring operation or when the zoom is shifted to the telephoto side to return the function of the focus controller 244 to the original focus control function, the positional information is read from the storage means to return the master lens group 216 to the original position.

A variety of the embodiment of the present invention will hereunder be described.

The zoom controller 242 is provided with a telephoto/wide-angle selection switch (not shown). If a telephoto (T) switch is pressed, the zoom shifts toward the telephoto end, and if a wide-angle (W) switch is pressed, the zoom shifts toward the wide-angle end. If the F.f. adjustment switch 246 is turned on and the wide-angle switch of the selection switch is pressed, the zoom shifts to the wide-angle end and the focus controller 244 is switched to the F.f. control function. The zoom may shift to the telephoto end so that the function of the focus controller 244 can be returned to the original focus control function, when the telephoto switch of the selection switch is pressed.

In the first, second and third embodiments, the potentiometers determine the rotated positions of the control members (e.g. the thumb ring 26A and the focus ring 28A) of the controllers in the absolute values; however, the present invention should not be restricted to this. It is also possible to use incremental encoders, which determine the rotated positions in the relative values.

As set forth hereinabove, according to the present invention, the focus controller for controlling the focus lens and the zoom controller for controlling the zoom lens are also used to control the master lens to enable the F.f. adjustment. If the lens to be driven by the controller is switched between the focus lens and the master lens or between the zoom lens and the master lens, the lens subject to the driving is moved in accordance with the operation of the controller after the switching regardless of the operation of the controller before the switching. This prevents the master lens from moving to the position designated by the control member of the controller when the function of the focus controller is switched to the master lens control function. This enables the F.f. adjustment of the master lens from the preset Ef. position without the necessity of performing the F.f. adjustment all over again.

According to the present invention, the focus controller for controlling the focus lens group is also used to control the master lens group, and there is provided the switch means for switching the functions of the focus controller. Therefore, the focus controller can adjust the position of the master lens group at the wide-angle side with the great depth of focus. This eliminates the necessity of providing a special controller for adjusting the position of the master lens group. Particularly, it is possible to easily blur the image by operating the controller at hand.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A TV lens control apparatus, which drives at least one movable lens of a focus lens and a zoom lens, and a master lens by motors, said TV lens control apparatus comprising:
   a controller for designating a position of said movable lens and said master lens by operating one control member, said controller outputting a control signal representing a value according to the operation of said control member;
   selecting means for deciding whether said movable lens or said master lens is the lens subject to be driven by the control signals outputted from said controller; and
   drive means for moving said lens subject to be driven by a moving amount, in accordance with an amount of changes in said control signals outputted from said controller after the switching operation, said moving amount being added to a position of the lens subject to be driven at a time of switching by said selecting means, said drive means maintaining the position of the other lens after switching by said selecting means, said maintained position being a position of the other lens at the instance of switching by said selecting means.

2. The TV lens control apparatus as defined in claim 1, wherein the lens subject to be driven is maintained at the position at the time of switching until said control member is moved.

3. The TV lens control apparatus as defined in claim 1, wherein said controller is a focus lens controller and said selecting means is a focus lens selecting means, said focus lens controller outputting said control signals to said focus lens or said master lens in accordance with said focus lens selecting means.

4. The TV lens control apparatus as defined in claim 3, further comprising a zoom lens controller and a zoom lens selecting means, said zoom lens controller outputting control signals to said zoom lens or said master lens in accordance with said zoom lens selecting means.

5. A TV lens control apparatus, which has a focus lens group, a zoom lens group and a master lens group and moves each lens group by a motor, said TV lens control apparatus comprising:
   a focus controller for outputting a lens movement instruction signal in accordance with the operation of a focus control member;
   a zoom controller for outputting a zoom instruction signal in accordance with the operation of a zoom control member;
   switch means which is turned on in order to adjust the position of said master lens group;
   detecting means for detecting the zoom position; and
   a control part for controlling the drive of said lens groups in accordance with the instruction signals from said focus controller and said zoom controller, said control part using the lens movement instruction signal outputted from said focus controller as a master lens group movement instruction to drive said master lens group in accordance with said lens movement instruction signal if said switch means is turned on and the zoom position detected by said detecting means is at a preset wide-angle side, and using the lens movement instruction signal outputted from said focus controller as a focus lens group movement instruction to drive said focus lens group in accordance with said lens movement instruction signal if the zoom position detected by said detecting means is at a preset telephoto side.

6. The TV lens control apparatus as defined in claim 5, wherein:
   said zoom controller has a telephoto/wide-angle selection switch as a zoom control member to output a zoom instruction signal for shifting said zoom lens group in a wide-angle direction when a wide-angle switch of said telephoto/wide-angle selection switch is selected, and output a zoom instruction signal for shifting said zoom lens group in a telephoto direction when the telephoto switch of said telephoto/wide-angle selection switch is selected; and
   said control part moves said zoom lens group to a wide-angle end and switches the function of said focus controller to a master lens group control function when said switch means is turned on and said wide-angle switch is pressed, and said control part moves said zoom lens group to a telephoto end and switches the function of said focus controller to a focus lens group control function when the telephoto switch is pressed.

7. A TV lens control apparatus, which drives at least one movable lens of a focus lens and a zoom lens, and a master lens by motors, said TV lens control apparatus comprising:
   a controller for designating a position of said movable lens and said master lens by operating one control member, said controller outputting a control signal representing a value according to the operation of said control member;
   selecting means for deciding whether said movable lens or said master lens is the lens subject to be driven by the control signals outputted from said controller; and
   drive means for moving said lens subject to be driven by a moving amount, in accordance with an amount of changes in said control signals outputted from said controller after the switching operation, said moving amount being added to a position of the lens subject to be driven at a time of switching by said selecting means, said drive means maintaining the position of the other lens after switching by said selecting means, said maintained position being a position of the other lens immediately after switching by said selecting means.

8. The TV lens control apparatus as defined in claim 7, wherein the lens subject to be driven is maintained at the position at the time of switching until said control member is moved.

9. The TV lens control apparatus as defined in claim 7, wherein said controller is a focus lens controller and said selecting means is a focus lens selecting means, said focus lens controller outputting said control signals to said focus lens or said master lens in accordance with said focus lens selecting means.

10. The TV lens control apparatus as defined in claim 7, further comprising a zoom lens controller and a zoom lens selecting means, said zoom lens controller outputting control signals to said zoom lens or said master lens in accordance with said zoom lens selecting means.

* * * * *